(No Model.) 2 Sheets—Sheet 2.
H. & J. KELLY.
WOOD TURNING LATHE.
No. 287,688. Patented Oct. 30, 1883.
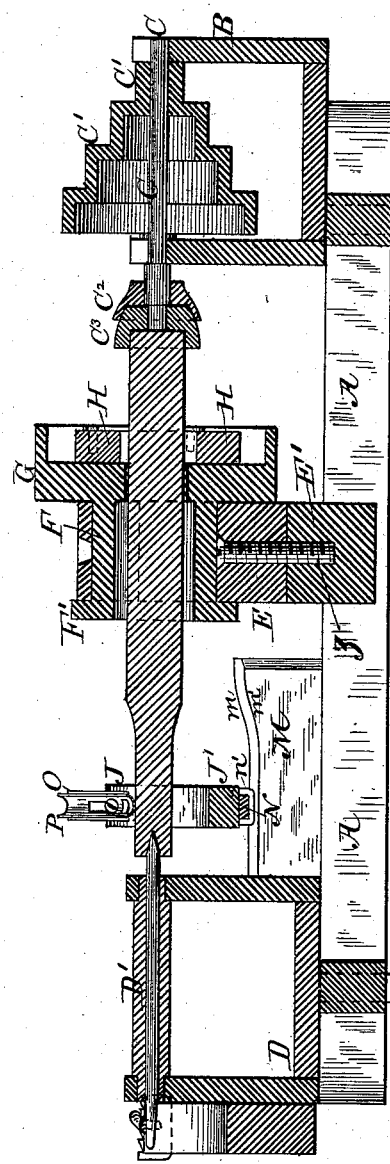
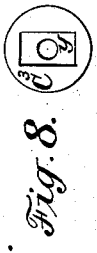
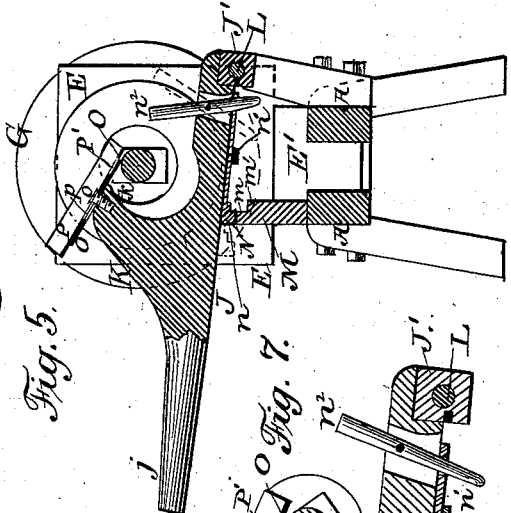
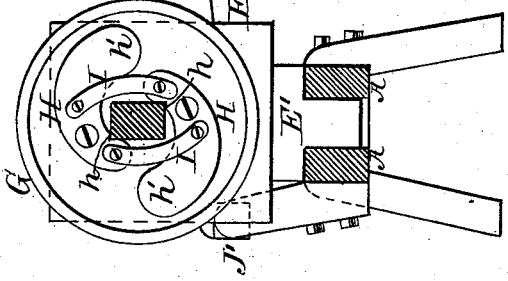
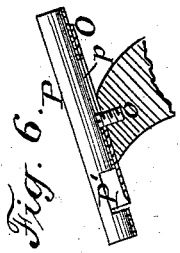
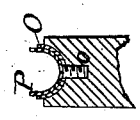
Attest:
Edmond Brodhag
Nowell Bartle
Inventors.
Henry Kelly,
Joseph Kelly,
by Johnson & Johnson
Attys.

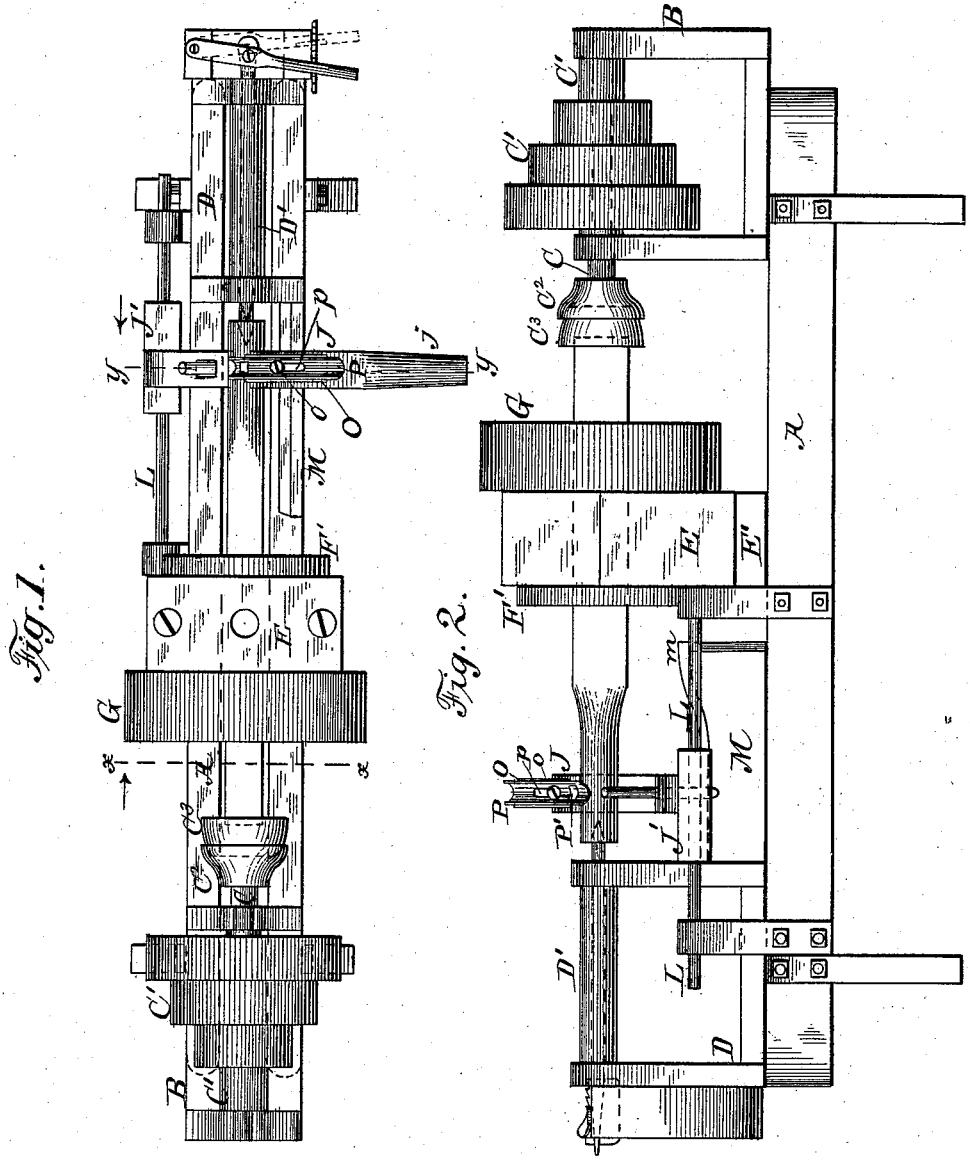

UNITED STATES PATENT OFFICE.

HENRY KELLY AND JOSEPH KELLY, OF GOSHEN, INDIANA.

WOOD-TURNING LATHE.

SPECIFICATION forming part of Letters Patent No. 287,688, dated October 30, 1883.

Application filed April 25, 1883. (No model.)

*To all whom it may concern:*

Be it known that we, HENRY KELLY and JOSEPH KELLY, citizens of the United States, residing at Goshen, in the county of Elkhart and State of Indiana, have invented new and useful Improvements in Wood-Turning Lathes, of which the following is a specification.

Our invention relates to improvements in wood-turning lathes or machines; and our said invention consists in providing a central bearing for the work adapted to be rotated with it, to be adjusted longitudinally of the machine and to be turned on a center pivot, whereby it can be turned to receive and present the work to the lathe-centers, support the work when centered, and in case taper stuff is being worked, moved over it toward its large end and tightened thereon to hold and support it firmly while under operation; in the construction and combination of the cutter-carrier, a guideway therefor, and a pattern having a multiple guiding face or edge of the same or different patterns, whereby two or more distinct cuts may be made upon the work in reducing it to the desired shape without changing the adjustment of the cutter; in providing the cutter-carrier with an adjustable gage having a series of stepped bearing-surfaces adapted for operation with the pattern and to determine the depth and number of the cuts; in the construction and the combination of a friction-clutch composed of cup-shaped parts with the live spindle and the adjustable spindle, whereby the rotation of the work may be stopped without shifting the belts or stopping the pulley-spindle; in combining with the center-bearing centrifugally-acting pivoted jaws adapted to clamp the work as it is revolved, and hold and support it while under operation, and in other matters which will be made the subject of specific claims.

The object, briefly, of this invention is to provide a turning lathe or machine that shall be simple in its construction and effective in its operation, long work being steadied at its central portion, crooked timber straightened, and regular or irregular shapes readily turned with unskilled labor.

Referring to the drawings, forming a part of this specification, and in which similar letters of reference indicate like parts in the several views, Figure 1 represents a plan, and Fig. 2 a side elevation, of a lathe or turning-machine constructed according to our invention. Fig. 3 represents a central longitudinal sectional elevation; Fig. 4, a transverse sectional elevation on the line $x\,x$, Fig. 1; and Fig. 5, a transverse sectional elevation on the line $y\,y$, Fig. 1. Fig. 6 represents detached enlarged views of the cutting-tool and its cover or gage; and Fig. 7, an enlarged detail of the tool-holder; Fig. 8, the friction-clutch part $C^3$.

A is the frame or shears of the machine, B the head-stock carrying the spindle or mandrel C with its pulley $C'$.

D is the tail-stock, carrying the back or sliding center $D'$.

Arranged between the head and tail stocks upon the shears of the machine is the "center-bearing" composed of a body or stand, E, pivoted centrally to a T-shaped piece, $E'$, which rests upon and between the shears A. Through the part E is a circular opening into which a hollow spool, F, is received and revolves. This spool F has a hole, $x$, Fig. 5, through it so as to drive the stick, and at one side a narrow flange, $F'$, and at the other a large broad rim or head, G, which confine the spool in its bearing, the head G forming the pulley or band-wheel by which motion may be imparted to the work. Within the rim G, and against the end of the spool F, is secured by a pivot-bolt at one end two jaws, H H. Each jaw is of similar construction, and they are made with a mouth or biting end, $h\,h$, and weighted ends $h'\,h'$.

I I are couplings secured to each of the jaws on each side of their pivots by which the movement of said jaws may be made to act in unison or simultaneously.

The mandrel head or chuck is composed of two cup-shaped disks or parts $C^2$ and $C^3$, the one, $C^2$, being rigidly secured, and the one, $C^3$, revolving loosely upon the spindle C within the part $C^2$. The cup-disk $C^3$, in addition to revolving loosely upon the spindle or mandrel, also has a limited endwise movement thereon, and it has an angular recess, $y'$, Fig. 8, to adapt it to receive and hold the work to be turned. These two cup-disks, therefore, when fitted together, form a friction-clutch and chuck or holder for holding the work and imparting motion thereto. By this provision the revolution of the work may be stopped at will by simply operating the back or sliding center, which, causing the parts of the clutch to separate, motion cannot be imparted to the work.

J is the tool-rest, having a handle or arm, j, by which it is operated, and bearing the cutting-tool O. This tool rest or holder is secured in position through a long bearing or box, J', sliding upon a fixed bar, L. By this provision a free longitudinal movement of the tool-holder is permitted, but no lateral play. The tool is therefore always held rigidly in place and wabbling and consequent digging sidewise into the wood is prevented.

At the side of the machine beneath the tool rest or holder J, and upon which said tool-holder rests, is secured a gage or pattern, M, the outline of the top edge of which is made to conform to the outline it is desired to give the finished work being turned. This gage or pattern is made of such a shape as is desired to shape the material to be turned, or of such a shape as to govern the movement of the tool to make material of such shape as is desired, and it is made double or multiple, so that the tool-rest may be passed over it twice or more—once over the highest part, m, and once over the lower part, m', so as to take two or more cuts, if necessary. In order to still further facilitate this matter a sliding gage or bar, N, is arranged beneath the tool rest or holder J, the end of which is stepped as at n. By adjusting this bar N so as to bring these steps n in succession upon the pattern a number of cuts may be taken upon the work. The sliding gage-bar N is secured on the under side of the tool holder or rest by a yoke or loop, n', and it is operated by a handle extending up through and pivoted to the tool-holder, the lower end of the handle passing through a slot in the sliding bar, as shown at $n^2$.

The cutting-tool O, Fig. 6, is slotted, of semi-tubular form, and adjustably secured, in a curved seat, to the rest by set-screw o. Upon the top of this tool is secured a tool cover or gage, P, made of metal, and of the same curvature or outline as the tool, and of such length as to be capable of extending beyond the cutting-edge of the tool just as much as it is desired the tool to cut. Through the cover P, near its end, is an opening, P', for the chips, and it is slotted at p and adjustably secured by the same set-screw that secures the cutting-tool. The object of this gage P is to prevent the tool cutting or digging into the work, this being accomplished by the projecting end of the gage coming against the wood, which permits the tool to cut only as much as the gage is set for, which of course may be varied to suit circumstances, and this tool-gage also prevents the tool from feeding too fast endwise by reason of the curved sides of the gage coming against the wood. This gage, therefore, prevents the feeding of the tool only just so fast as the cutting-tool will cut and clear away a path for the gage.

The operation of the several parts of the turning-lathe, hereinbefore described, is as follows: To insert the stick or material to be turned, the center-bearing is turned on its center pin, z, Fig. 3, so as to bring the opening therein at about right angles to the machine. The stick is then passed through the center-bearing and brought around into position between the head and back center. Bringing up the back center tight against the stick forces it into the chuck or head, and causes the two parts or cups of said head to come tight together, which imparts the movement of the spindle or mandrel, which may be kept running all the time, at once to the stick. To release the stick, all that is necessary to be done is to move back the back center, when the clutch releases itself and the stick ceases to turn. Instead of having the movement imparted to the wood or stick by the usual pulley on the spindle, the same result is accomplished by passing the band around the center-bearing, provision being made for this purpose. The two ends, head and tail stocks of the machine, therefore become dead-centers. As the stick or material being turned revolves, carrying with it the center-bearing, the jaws pivoted to the head of the center-bearing come into play, this by reason of the weighted ends of the jaws moving by centrifugal action away from the center, and thereby causing the short end or mouth of the jaws to securely bite and hold the stick. As is apparent, this biting or holding action of the centrifugal-acting jaws increases as the speed or revolution of the stick increases. The function of these jaws, acting by their centrifugal motion, is to draw the stick to the center and hold it there, thereby acting to straighten crooked stuff. To assist the simultaneous action of the jaws, they may be united by couplings crossing from each one to the other, as here shown; but this may not be necessary. The duty of the center-bearing is to hold and steady the work at its central part and to assist in straightening the same, this being particularly necessary in long stuff—such as masts, spars, &c.—where the work is long and has a tendency to sag. This center-bearing may be made movable along the bed or shears of the machine, as hereinbefore explained, and the clamping-jaws omitted, in which case the center-bearing acts in a very efficient manner in turning taper stuff, for it will work toward the larger end, and then tighten and hold it.

The action of the cutting tool and its appurtenances is about as follows: By reason of the long bearing sliding upon the bar, the lateral movement or wabbling of the tool is prevented. The shape of the gage or pattern beneath the tool-rest, and upon which said tool-rest plays, causes the tool to approach directly to and remove directly from the work as it moves up and down the pattern. To take another cut, the sliding gage-bar secured beneath the tool-rest is moved so as to bring the end of the gage upon the lower edge, m', of the pattern, or a lower level of the gage-bar upon the top edge of the pattern. By this the cutting-tool is brought in the same relative position as at first, nearer the work. The movement of the cutting-tool is from left to right—that is, the tool-rest starts at the top of the pattern, commencing to cut at a point distant from the back center equal to the length of the pattern, and finishing the cut at the lower end of the pattern adjacent to the back center. The pattern may be of a length equal to the finished work, or it may be made adjustable along the bed of the machine, so several cuts upon the article may be made, if desired or found necessary. The tool-rest may also be moved back and forth by proper machinery, if desired. To remove the stick the back center is moved back, which separates the clutch and causes the work to stop moving. A further movement of the back center entirely releases the material, and by turning the center-bearing on its pivot it may be easily withdrawn from the machine.

The tool-rest herein described is of novel construction and operates in a novel manner, being so formed in connection with the gage or pattern that the tool is made to advance directly to and recede directly from the work, this being accomplished by placing or making the body of the rest or part J, which is secured at one end to the sliding-box J' on the guiding-rod L, and at the other forms the handle j, to extend beneath the work and forming an upward curved portion, K, thereto or thereon, to the end k of which the cutting-tool is secured. By this construction of tool-rest, when the cutting-tool commences its cut, it is almost over a central line through the back center, and when finishing its cut a little to the opposite side of the central line. The cut or path of the tool commences at the top of the stick back of the back center, and taking a slight curve ends at the end of the stick adjacent to the back center.

The ordinary gage used in gage-lathes is only a single pattern, so that the piece to be turned must be reduced at a single cut; but by this arrangement of double or multiple pattern herein shown, the first cut may be used only to cut off the corners, while the next or lower pattern is used to reduce it still more to the shape or finish it, and so on. These patterns may be multiplied to any extent or number, reducing the piece to be turned gradually to the desired smoothness or shape. This is especially useful where there is a large amount of material to be cut from the piece.

Another important feature in this invention is the sliding gage, which rests upon and is particularly applicable to a single pattern, and which determines the depth of the cut to be taken from the piece being turned. This gage is made like steps, so that as it is moved by means of the lever above, a different step rests on the pattern and thus lowers the cutting-tool so that a number of cuts may be taken on the same pattern. Thus a number of patterns may be used of the same or different shapes, the last or lower one being the shape desired for the finished piece, the sliding gage permitting a number of cuts to be taken on each or every one of these patterns. The cutter has a semi-tubular form, and has a bottom slot so that it can be set out as required, and the gage P being of corresponding form, is fitted within and secured upon the cutter, and has a front clearing-slot and a bottom slot to allow of its proper adjustment in relation to the cutter.

Having thus fully described our invention, its nature, objects, advantages, &c., what we claim as new therein, and desire to secure by Letters Patent, is—

1. The combination, in a turning-lathe, of the work-supporting centers, with a central bearing for the work adapted to rotate with it, and a box or housing for said bearing adapted to be turned on a central pivot, and adjusted longitudinally upon the shears, for the purpose hereinbefore described.

2. In a turning-lathe, the combination, with the center-bearing adapted to be revolved with the work, of jaws pivoted to one end of the center-bearing on opposite sides of its center opening, having weighted ends, and adapted by the rotation of the said center-bearing to automatically clamp their non-weighted ends upon the work, substantially as described for the purpose specified.

3. The combination, in a turning-lathe, of a center-bearing for the work, and means secured to one end of said bearing for automatically clamping and rotating the work, consisting of the centrifugal-acting jaws H H, pivoted to one end of said bearing and coupled in the manner and for the purpose set forth.

4. In a turning-lathe, the combination, with the head-stock spindle C, of a friction-clutch for holding and imparting motion to the work, composed of a cup-shaped disk, $C^2$, fixed upon said spindle and a loose cup-shaped disk $C^3$, seated within the said spindle-cup, and adapted to receive the work and to be driven by frictional contact with the spindle-cup produced by force applied to the work to be turned.

5. The combination, in a turning-lathe, of a cutter-carrier, J, and a guideway, L, therefor with a pattern or way, M, having a multiple guiding face or edge for said tool-carrier, whereby two or more cuts may be made upon the work as hereinfore described.

6. The combination, in a turning-lathe, of a cutter-carrier, J, a guideway, L, therefor, and a way or pattern, M, fixed upon the frame with a stepped gage, N n, carried by said cutter-carrier, and means substantially such as described, whereby the said stepped gage is adjusted in relation to the fixed way or pattern.

7. The combination, in a turning-lathe, of a cutter-carrier, J, a fixed guide, L, therefor, and the fixed way or pattern M, having a multiple face or guiding edge, m m', with a stepped gage, N n, having one or more guiding edges adjustably carried by the cutter-carrier.

8. In a turning-lathe, the combination, with the fixed pattern M, of a cutter-carrier, J, having an adjustable stepped gage on its under side, and an adjustable cutter on its upper side, substantially as described.

In testimony whereof we have hereunto set our hands in the presence of two subscribing witnesses.

HENRY KELLY.
JOSEPH KELLY.

Witnesses:
ENOCH EBY,
W. J. DAVIS.